(12) United States Patent
Masutani et al.

(10) Patent No.: US 7,811,468 B2
(45) Date of Patent: Oct. 12, 2010

(54) METHOD OF FORMING A COMPOSITE CONTAINING A MATRIX COMPONENT AND AT LEAST ONE LIQUID CRYSTAL COMPONENT

(75) Inventors: Akira Masutani, Kernen (DE); Akio Yasuda, Stuttgart (DE); Anthony Roberts, Brandon (GB); Marek Szablewski, Durham (GB); David Bloor, Durham (GB); Graham Cross, Bishopton (GB)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 12/353,536

(22) Filed: Jan. 14, 2009

(65) Prior Publication Data

US 2009/0121185 A1 May 14, 2009

Related U.S. Application Data

(63) Continuation of application No. 10/498,166, filed as application No. PCT/EP02/14243 on Dec. 13, 2002, now Pat. No. 7,528,904.

(30) Foreign Application Priority Data

Dec. 13, 2001 (EP) ................................. 01 129 709

(51) Int. Cl.
| | |
|---|---|
| *C09K 19/52* | (2006.01) |
| *C09K 19/60* | (2006.01) |
| *C09K 19/54* | (2006.01) |
| *G02F 1/1334* | (2006.01) |

(52) U.S. Cl. .............................. 252/299.01; 252/299.1; 252/299.5; 428/1.1; 349/88; 349/92

(58) Field of Classification Search ............ 252/299.01, 252/299.1; 349/88; 428/1.1
See application file for complete search history.

(56) References Cited

U.S. PATENT DOCUMENTS

| | | | |
|---|---|---|---|
| 5,585,947 A | 12/1996 | Havens et al. | |
| 5,631,665 A | 5/1997 | Takizawa et al. | |
| 5,667,720 A | 9/1997 | Onishi et al. | |
| 5,769,393 A * | 6/1998 | Kobayashi et al. | ..... 252/299.01 |
| 7,123,319 B2 | 10/2006 | Broer et al. | |
| 7,528,904 B2 * | 5/2009 | Masutani et al. | ............. 349/92 |
| 2005/0079663 A1 | 4/2005 | Masutani et al. | |

FOREIGN PATENT DOCUMENTS

| | | |
|---|---|---|
| EP | 0 575 791 | 12/1993 |
| EP | 0 590 376 | 4/1994 |
| WO | WO 96/13561 | 5/1996 |
| WO | WO 96/19547 | 6/1996 |
| WO | WO 96/20986 | 7/1996 |

OTHER PUBLICATIONS

English translation by computer for JP 07-104257, http://www4.ipdl.inpit.go.jp/Tokujitu/PAJdetail.ipdl?N0000=60&N0120=01&N2001=2&N3001=H07-104257 (2001).*

* cited by examiner

*Primary Examiner*—Shean C Wu
(74) *Attorney, Agent, or Firm*—Oblon, Spivak, McClelland, Maier & Neustadt, L.L.P.

(57) ABSTRACT

A method of forming a composite containing a matrix component and at least one liquid crystal component includes providing a matrix, providing a first material that is phase separable from the matrix, adding the first material to the matrix, and replacing the first material that is phase separable form the matrix with a second material exhibiting liquid crystalline behavior.

19 Claims, 9 Drawing Sheets

Figure 1:

METHOD OF FORMING A COMPOSITE CONTAINING A MATRIX COMPONENT AND AT LEAST ONE LIQUID CRYSTAL COMPONENT

CROSS-REFERENCE TO RELATED APPLICATIONS

This application is a continuation of U.S. application Ser. No. 10/498,166, filed Jun. 9, 2004, the entire contents of which are incorporated herein by reference. U.S. application Ser. No. 10/498,166 is National Stage of International application PCT/EP02/14243 filed Dec. 13, 2002, and claims the benefit of priority under 35 U.S.C. §119 from European Application No. EP 01 129 709.0 filed Dec. 13, 2001.

The present invention relates to a method of forming a composite containing a matrix component and at least one liquid crystal component. It also relates to a composite obtainable thereby, and to uses thereof.

Ever since it was first demonstrated, in 1976, that it was possible to change a liquid crystal composite from an opaque to a transparent state, a tremendous amount of research effort has been invested to achieve progress and to adapt this phenomenon for use in electronic components etc. The principle of changing a liquid crystal from an opaque to a transparent state was applied to a porous polymer matrix (Craighead et al., 1982, Appl. Phys. Lett. 40, 22), which was filled with a liquid crystal. The idea of encompassing a liquid crystal within a matrix, which in Craighead's experiments showed a poor performance, was further developed in 1985 by Fergason (1985, SID Int. Symp. Digest of Tech. Papers, 16, 68) and Drzaic, (1986, J. Appl. Phys., 60, 2142) who reported liquid crystal-polymer composites obtained by drying an emulsion of liquid crystal in an aqueous solution of polyvinyl alcohol. These materials were termed "nematic curvilinear aligned phase" (NCAP) which found use in smart window applications. In NCAP applications the liquid crystal is encapsulated by standard microencapsulation or emulsification techniques which suspend it in a solid polymer film.

Another technique which was developed on the basis of Craighead's idea to embed the liquid crystal in a polymer matrix, is the so called PDLC-technique (polymer-dispersed liquid crystal). This is achieved by preparing a homogeneous mixture of a liquid crystal and a pre-polymer and thereafter inducing a phase separation by causing the pre-polymer to form a solid network, thereby inducing the liquid crystal form droplets embedded in the polymer network. Various techniques have been developed to achieve such formation of a polymer network which are used depending on the individual circumstances. For example, when a pre-polymer material is miscible with a liquid crystal compound a phase separation by polymerization is used. This technique is referred to as polymerization-induced phase separation (PIPS). A homogeneous solution is made by mixing the pre-polymer with the liquid crystal. Thereafter a polymerization is achieved through a condensation reaction, as with epoxy resins, or through a free radical polymerization, as with vinyl monomer catalyzed with a free radical initiator such as benzoyl peroxide, or by a photo-initiated polymerization. Upon polymerization the solubility of the liquid crystal decreases in the lengthening polymers until the liquid crystal forms droplets or an interconnected liquid crystal network within a growing polymer network. When the polymer starts to gel it will lock the growing droplets or the interconnected liquid crystal network thereby arresting them/it in their/its state at that time. The droplet size and the morphology of droplets or the dimensions of the liquid crystal network are determined during the time between the droplet nucleation/initiation of network formation and the gelling of the polymer. Important factors are the rate of polymerization, the relative concentrations of materials, the temperature, the types of liquid crystal and polymers used and various other physical parameters, such as viscosity, solubility of the liquid crystal in the polymer. Reasonably uniform size droplets can be achieved by this technique. Sizes prepared in the past have ranged from 0.01 µm-30 µm. Polymerisation induced phase separation (PIPS) is a preferred method for forming PDLC films. The process begins with a homogeneous mixture of liquid crystal and monomer or pre-polymer. Polymerisation is initiated to induce phase separation. Droplet size and morphology are determined by the rate and the duration of polymerisation, the types of liquid crystal and polymers and their proportions in the mixture, viscosity, rate of diffusion, temperature and solubility of the liquid crystal in the polymer (West, J. L., *Phase-separation of liquid-crystals in polymer*. Molecular Crystals and Liquid Crystals, 1988. 157: p. 427-441, Golemme, A., Zumer, S., Doane, J. W., and Neubert, M. E., *Deuterium nmr of polymer dispersed liquid crystals*. Physical Review a, 1988. 37(2): p. 599-569, Smith, G. W. and Vaz, N. A., *The relationship between formation kinetics and microdroplet size of epoxy based polymer-dispersed liquid-crystals*. Liquid Crystals, 1988. 3(5): p. 543-571, Vaz, N. A. and Montgomery, G. P., Refractive-indexes of polymer-dispersed liquid-crystal film materials epoxy based system. Journal Of Applied Physics, 1987. 62(8): p 3161-3172). In ultraviolet light (UV) initiated polymerisation, the rate of curing may be changed by changing the light intensity (Whitehead Jr, J. B., Gill, N. L., and Adams, C., *Characterization of the phase separation of the E7 liquid crystal component mixtures in a thiol-ene based polymer*. Proc. SPIE, 2000. 4107: p. 189). The PIPS method using free-radical polymerisation is by far the most studied, and the majority of free-radical polymerisation systems are initiated by UV light. The process has several advantages over other methods such as, better phase separation, uniform droplet size, and better control of the droplet size. However, the presence of dyes that absorb UV and visible radiation in the mixture prior to curing can lead to incomplete or the complete prevention of successful curing. Furthermore, the dyes may decompose upon curing.

Another technique used for obtaining PDLC composites is thermal induced phase separation (TIPS). This technique can be used for liquid crystal materials and thermoplastic materials which are capable of forming a homogenous solution above the melt temperature of the polymer. The homogenous solution of liquid crystal in the thermoplastic melt is cooled below the melting point of the thermoplastic material, thereby causing a phase separation of the liquid crystal. The droplet size of the liquid crystal is determined by the rate of cooling and a number of other material parameters. Examples of TIPS-prepared composites are polymethylmethacrylate (PMMA) and polyvinylformal (PVF) with cyanobiphenyl liquid crystal. Generally, the concentrations of liquid crystals required for TIPS-film are larger in comparison to PIPS-prepared films.

Another technique used to prepare polymer dispersed liquid crystal composites is solvent-induced phase separation (SIPS). This makes use of a liquid crystal and a thermoplastic material dissolved in a common solvent thereby forming a homogenous solution. The ensuing evaporation of the solvent results in phase separation of the liquid crystal, droplet formation and growth, and polymer gelation. Solvent evaporation can also be used in conjunction with thermal processing of materials which melt below their decomposition temperature. First of all films are formed on a suitable substrate using standard film coating techniques, e.g. doctor blading, spin coating, web coating, etc. The solvent is thereafter removed with no concern of droplets size or density. Then the film is warmed again to re-dissolve the liquid crystal in the polymer and then cooled at a rate which is chosen to give the desired droplet size and density. In effect, the latter example is a combination of SIPS with TIPS.

A common problem encountered with all of these aforementioned techniques is the fact that the phase-separation achieved is only incomplete, i.e. some of the liquid crystal plasticizes the polymer network formed, because it stays co-dissolved within the polymer. This is disadvantageous for any electronic device making use of such liquid crystal.

Electronic device display technologies require displays with high brightness and contrast, low power consumption, and fast refresh speeds. For flexible displays, polymer thin film technology is being explored and in particular, polymer dispersed liquid crystal films (=PDLC) are of interest. In these materials it is important to achieve good phase separation of the components with minimal co-dissolution. Such co-dissolution reduces the scattering-switching contrast between "on" and "off" states. Furthermore, if coloured dyes are used to produce coloured PDLC films, dissolution of the dye into the inactive polymer matrix reduces colour-switching contrast. An additional impediment is that in the preferred curing method, that of ultra-violet light photo curing, many coloured dyes undergo photodegradation. There are other advantages which would make it appear desirable to add dyes to PDLC composite films. Addition of dipolar dyes can, for example lead to faster "turn-on" times.

Another problem commonly encountered with PDLC composites is the fact that additional components dissolved in the liquid crystal are sensitive to the phase separation process and frequently are damaged in the course of the polymerization and/or the formation of the polymer matrix. For example it is very difficult to include UV-sensitive dyes which survive photoinduced polymerization. Accordingly it has been a problem to produce PDLC-composites which are coloured by the inclusion of dyes.

Therefore it has been an object of the present invention to avoid co-dissolution of the liquid crystal component, damaging of additional components by conditions associated with polymer formation etc. and the other problems associated with the prior art.

It has further been an object to provide polymer dispersed liquid crystal composites which are useful for colour application and/or have a better performance.

The object of the invention is solved in a first aspect by method of forming a composite containing a matrix component and at least one liquid crystal component, comprising the following steps:
a) providing a matrix,
b) providing a first material that is phase separable from the matrix,
c) adding the first material to the matrix,
d) adding a second material exhibiting liquid crystalline behaviour to the matrix.

Preferably, the method according to the present invention comprises as step d): replacing the first material that is phase separable from the matrix with a second material exhibiting liquid crystalline behaviour.

In a preferred embodiment the first material exhibits liquid crystalline behaviour. In one embodiment the first material is liquid.

Preferably, the first material is selected from the group comprising water, aqueous solutions, aqueous suspensions, aqueous emulsions and oils.

It is preferred that the matrix is a polymer-matrix.

Preferably the matrix is porous.

The term "porous" as used herein is meant to signify that the matrix provides an interstitial space wherein other matter can be taken up, e.g. liquids. Preferred embodiments of a matrix according to the present invention are sponges, filters, filter papers, gels, networks, sieves, polymer gels, polymer sieves.

Further examples of the matrix are inorganic networks, e.g. silica networks, which can for example be produced by a sol-gel process, or xerogels. The latter term applies to any very low-density network where there is a continuous void phase and where there is a solid phase that is either of an organic or inorganic material.

In a preferred embodiment the interstitial space has dimensions in the x, y, z-directions taken from the range 100 nm-30 µm, more preferably 500 nm-10 µm and even more preferably 600 nm-5 µm. Most preferably the interstitial space's dimensions (pore size) are centered around 3 µm.

The idea of these dimensions is, that, although this is not absolutely essential to the invention, scattering of electromagnetic radiation shall be achieved by appropriate choice of dimensions. Without wishing to be bound by any particular theory, the inventors have found that by choosing the aforementioned dimensions, scattering can be achieved and thereby the absorption of electromagnetic radiation through dyes, possibly included in the liquid crystalline phase, can be enhanced, because the pathlength of light has been increased.

Preferably, the maximum refractive index difference between the matrix and the liquid crystal material is >0.01, in order to achieve scattering.

The term "phase separable" is meant to designate the fact that where a material is denoted as "phase separable" from the matrix etc. it can be separated therefrom due to it having a phase different to the phase of the matrix etc., i.e. the phase is the separating criterion.

Preferably, the first material exhibiting liquid crystalline behaviour is the same as the second material exhibiting liquid crystalline behaviour.

In another embodiment, the first material exhibiting liquid crystalline behaviour is different to the second material exhibiting liquid crystalline behaviour.

It is preferred that the second material exhibiting liquid crystalline behaviour contains at least one additional component, which, preferably, is soluble in the second material.

More preferably, the soluble component is selected from the group comprising dyes, compounds with permanent dipoles, rod-like structure materials, nanotubes.

In one embodiment, the soluble component is selected from the group comprising UV-sensitive dyes, UV-stable dyes, cis-trans isomer dyes, dichroic dyes and dipolar dyes.

Preferably, the composite after d) is heated above the isotropic temperature of the second material, wherein, more preferably, the heating is above the isotropic temperature of the second material, but below the decomposition temperature/melting temperature of the matrix.

In a second preferred aspect, the object is solved by a method of forming a composite containing at least one polymer component and at least one liquid crystal component, comprising the following steps:
a) providing a material capable of forming a solid polymer,
b) providing a material that is phase separable from the solid polymer,
c) inducing the material capable of forming a solid polymer, to form a solid polymer,
d) adding a liquid crystal material.

Preferably, the material that is phase separable from the solid polymer is selected from the group comprising water, aqueous solutions, aqueous suspensions, aqueous emulsions and oils.

In a preferred embodiment, the material that is phase separable from the solid polymer is a liquid crystal material.

In one embodiment, the liquid crystal material of step d) is the same as the liquid crystal material that is phase separable from the solid polymer.

In another embodiment, the liquid crystal material of step d) is different to the liquid crystal material that is phase separable from the solid polymer.

Preferably, the liquid crystal material of step d) contains at least one additional component.

It is preferred that the at least one additional component is soluble in the liquid crystal material, wherein, preferably, the soluble component is selected from the group comprising dyes, compounds with permanent dipoles, rod-like structure materials, nanotubes.

More preferably, the soluble component is selected from the group comprising UV-sensitive dyes, UV-stable dyes, cis-trans isomer dyes, dichroic dyes and dipolar dyes.

In a preferred embodiment, step d) comprises the following substep da): removing the liquid crystal material that is phase separable from the solid polymer, by a process selected from the group comprising washing out, evaporation and suction.

It is to be understood that the removal of the liquid crystal material that is phase separable from the solid polymer and the addition of the liquid crystal material of step d) may be serial or concomitant.

In one embodiment, in step d) the liquid crystal material is added to the mixture by a process selected from imbibing the liquid crystal material into the solid polymer, flooding the solid polymer with the liquid crystal material, immersing the solid polymer into the liquid crystal material, capillary force filling the solid polymer under vacuum.

Preferably, in step c) a polymer dispersed liquid crystal pre-composite is formed by a phase separation process.

It is preferred that the phase separation process is selected from the group comprising thermally-induced phase separation (TIPS), solvent-induced phase separation (SIPS) and polymerization-induced phase separation (PIPS).

Preferably, the composite after d) is heated above the isotropic temperature of the liquid crystal material of step d), wherein, more preferably, the heating is above the isotropic temperature of the liquid crystal material of step d), but below the decomposition temperature/melting temperature of the solid polymer.

In a third preferred aspect the object of the present invention is solved by a method of forming a composite containing at least one polymer component and at least one liquid crystal component, comprising the following steps:
a) providing a material, containing polymer precursors,
b) providing a first liquid crystal material,
c) mixing the material, containing polymer precursors, and the liquid crystal material to form a mixture,
d) inducing the material, containing polymer precursors, to undergo a polymerization reaction,
e) adding a second liquid crystal material to the mixture.

In one embodiment, the second liquid crystal material is the same as the first liquid crystal material, wherein, preferably, the second liquid crystal material is different to the first liquid crystal material.

It is preferred that the second liquid crystal material contains at least one additional component, wherein, preferably, the at least one additional component is soluble in the second liquid crystal material and the first liquid crystal material, or in the second liquid crystal material only.

In one embodiment, the additional component, which is soluble in the second liquid crystal material and the first liquid crystal material, or in the second liquid crystal material only, is selected from the group comprising dyes, compounds with permanent dipoles, rod-like structure materials and nanotubes.

Preferably, the soluble component is selected from the group comprising UV-sensitive dyes, UV-stable dyes, cis-trans isomer dyes, dipolar dyes and dichroic dyes.

In one embodiment, step e) comprises the following substep ea): removing the first liquid crystal material from the mixture by a process selected from the group comprising washing out, evaporation and suction.

Preferably, in step e) the second liquid crystal material is added to the mixture by a process selected from imbibing the liquid crystal material into the mixture, flooding the mixture with the liquid crystal material, immersing the mixture into the liquid crystal material and capillary force filling the mixture under vacuum.

Preferably, the composite after e) is heated above the isotropic temperature of the second liquid crystal material, wherein, more preferably, the heating is above the isotropic temperature of the second liquid crystal material, but below the decomposition temperature/melting temperature of the polymer formed in d).

It is to be understood that the removal of the first liquid crystal material and the addition of the second liquid crystal material may be serial or concomitant.

In a fourth aspect, the object of the invention is also solved by a composite obtainable by a method according to the present invention, wherein, preferably, the composite contains a liquid crystal component doped with a compound selected from the group comprising dyes, UV-sensitive dyes, UV-stable dyes, dichroic dyes, dyes with a permanent dipole, rod-like structure material and nanotubes.

In a preferred embodiment, the composite is characterized by the following features: $T_{max}$ and $T_{min}$ having ranges of from 0-100%, $V_{10}$, $V_{90}$ and $V_{sat}$ having ranges of from 0->100V, wherein, preferably, $T_{max}$ has a range of from 80~100%, $T_{min}$ has a range of from 0~30%, $V_{10}$ has a range of from 0~5V, $V_{90}$ has a range of from 5~20V, Absorption$_{on}$ has a range of from 0.05~0.10, and Absorption$_{off}$ has a range of from 0.90~1.00.

In a fifth aspect, the object of the present invention is also solved by a composite containing at least one solid polymer component and at least one liquid crystal component, characterized in that it contains a liquid crystal component doped with a compound selected from the group comprising dyes, UV-sensitive dyes, UV-stable dyes, dichroic dyes, dyes with a permanent dipole, rod-like structure materials and nanotubes.

Preferably, the composite is characterized by the following features: $T_{max}$ and $T_{min}$ having ranges of from 0-100%, $V_{10}$, $V_{90}$ and $V_{sat}$ having ranges of from 0->100V, wherein, more preferably, $T_{max}$ has a range of from 80~100%, $T_{min}$ has a range of from 0~30%, $V_{10}$ has a range of from 0~5V, $V_{90}$ has a range of from 5~20 V, Absorption$_{ON}$ ($A_{ON}$) has a range of from 0.05~0.10, Absorption$_{OFF}$ ($A_{OFF}$) has a range of from 0.90~1.00, and/or the contrast ratio $A_{OFF}/A_{ON}$ has a range of from 6~20.

The values for $T_{max}$, $T_{min}$, $V_{10}$, $V_{90}$, $V_{sat}$ are dependent on the sample and the cure conditions and vary from 0~100% ($T_{max}$, $T_{min}$), and from 0~>100V ($V_{10}$, $V_{90}$, $V_{sat}$).

In a sixth aspect, the object is furthermore solved by a composite containing at least one solid polymer component and at least one liquid crystal component, characterized by the following features: $T_{max}$ and $T_{min}$ having ranges of from 0-100%, $V_{10}$, $V_{90}$ and $V_{sat}$ having ranges of from 0->100V, wherein, in one embodiment, $T_{max}$ has a range of from 80~100%, $T_{min}$ has a range of from 0~30%, $V_{10}$ has a range of from 0~5V, $V_{90}$ has a range of from 5~20V, $Absorption_{on}$ has a range of from 0.05~0.10, and $Absorption_{off}$ has a range of from 0.90~1.00.

In a seventh aspect the object of the present invention is solved by a device containing a composite according to the present invention.

In one embodiment, the device is characterized by the following features: $T_{max}$ and $T_{min}$ having ranges of from 0-100%, $V_{10}$, $V_{90}$ and $V_{sat}$ having ranges of from 0->100V, wherein, preferably, $T_{max}$ has a range of from 80~100%, $T_{min}$ has a range of from 0~30%, $V_{10}$ has a range of from 0~5V, $V_{90}$ has a range of from 5~20V, $Absorption_{on}$ has a range of from 0.05~0.10, and $Absorption_{off}$ has a range of from 0.90~1.00.

In an eighth aspect, the object is solved by the use of a device or of a composite according to the present invention in a display, a smart window, a membrane, an optical valve, a Bragg grating, an optically sensitive memory, an infrared shutter, a gas flow sensor, a pressure sensor and/or a polarizer.

In a ninth aspect, the object is also solved by a method of forming a composite containing at least one solid polymer component and at least one liquid crystal component, comprising the following steps:
a) providing a material, capable of forming a solid polymer,
b) providing a liquid crystal material,
c) mixing the material, capable of forming a solid polymer, and the liquid crystal material, to form a mixture,
d) inducing the material, capable of forming a solid polymer, to form the at least one solid polymer component,
e) removing the liquid crystal material from the mixture,
f) adding a liquid crystal material to the mixture so as to make the at least one liquid crystal component.

In one embodiment the liquid crystal material of step f) is different to the liquid crystal material of step e).

In another embodiment the liquid crystal material of step f) is the same as the liquid crystal material of step e).

It is preferred that in step e) the liquid crystal material is removed from the mixture by a process selected from the group comprising washing out, evaporation, suction.

Preferably in step f) the liquid crystal material is added to the mixture by a process selected from imbibing the liquid crystal material into the solid polymer, flooding the solid polymer with the liquid crystal material, immersing the solid polymer into the liquid crystal material, capillary force filling the solid polymer under vacuum.

It is to be understood that the removal step and the addition step may be serial or concomitant.

In one embodiment the material, capable of forming a solid polymer, is induced in step d) to form the at least one solid polymer component by means of a phase change.

Preferably the phase change is from liquid to solid.

It is preferred that the phase change is brought about by evaporation of a solvent, contained in the mixture.

In one preferred embodiment the additional steps are comprised:
ba) providing a solvent, and
ca) admixing the solvent of ba) to the mixture.

Preferably the solvent, provided in ba) is capable of dissolving both the material, capable of forming a solid polymer, and the liquid crystal material.

In one embodiment the phase change is brought about by lowering the temperature of the mixture.

In another embodiment the material, capable of forming a solid polymer, comprises polymer precursors selected from the group comprising monomers and oligomers.

Preferably the material, capable of forming a solid polymer, is induced in step d) to form the at least one solid polymer component by means of a polymerization reaction.

In one embodiment the liquid crystal material added in step f) comprises a substance selected from dyes, compounds with permanent dipoles, rod-like structure materials and nanotubes.

Preferably the substance selected from dyes, compounds with permanent dipoles, rod-like structure materials and nanotubes is sensitive to a condition associated with solvent evaporation, lowering of the temperature or the polymerization reaction according to the present invention.

Preferably the substance selected from dyes, compounds with permanent dipoles, rod-like structure materials and nanotubes is sensitive to UV-light.

Preferably, the composite after f) is heated above the isotropic temperature of the liquid crystal material of step f), wherein, more preferably, the heating is above the isotropic temperature of the liquid crystal material of step f), but below the decomposition temperature/melting temperature of the at least one solid polymer component.

In a tenth aspect, the object of the present invention is also solved by a polymer dispersed liquid crystal composite, containing at least one solid polymer component and at least one liquid crystal component, wherein the liquid crystal component is the result of a replacement step. Preferably the replacement step has taken place after formation of the solid polymer component. In one embodiment, the matter that has been replaced, is a liquid, preferably a(nother) liquid crystal component In one embodiment the liquid crystal component is the result of a replacement step of a liquid crystal component of the same type.

As used herein, the term "replacement" can mean a replacement overall, i.e. a complete replacement or a replacement in parts. For example, a matrix comprising undoped liquid crystal material may be soaked in the same liquid crystal material except for that the "soaking" liquid crystal material may contain additional solutes, e.g. dyes. As a result of such a "replacement" process, the liquid crystal material contained in the matrix may still be the same, whereas the solute has diffused into the liquid crystal. It can, however, also mean replacement of one type of material through another type of material. The term "replacement" should not be construed to only mean complete replacement.

As used herein, a material, capable of forming a solid polymer can be any material which has the capability of forming a solid polymer. This can, e.g. be a material comprising monomers, oligomers, etc., or it can be a polymer melt which will solidify and thereby form a solid polymer. It can also be a solution of a polymer, which will form a solid polymer upon evaporation of the solvent.

A "solid" polymer, as used herein, can be solid throughout, or it may have pores or interstitial spaces, or it may be a polymer gel or polymer network.

A polymer dispersed liquid crystal pre-composite, as used herein, is meant to signify a polymer dispersed liquid crystal, prepared according to the prior art, hence a liquid crystal wherein no replacement of the liquid crystal material has taken place. A phase separation process is meant to denote any process wherein two phases separate from each other.

These two phases may have existed originally, or they may developed in the course of the events. The terms thermally-induced phase separation (TIPS), solvent-induced phase separation (SIPS) and polymerization-induced phase separation (PIPS) are used herein as they are used for example in the prior art (cf. Bouteiller, L. et al., 1996, Crystals, vol. 21, No. 2, 157-174; or Doane et al., 1988, Mol. Cryst. Liq. Cryst., vol. 165, pp. 511-532; or Whitehad et al., 2000 Proc. SPIE, vol. 4107, pp. 189-197), which are incorporated by reference.

A "polymer precursor" may be any precursor which is able, either by itself or by means of other additives to form a polymer. One example for polymer precursor is monomers, oligomers, etc. Polymer precursors may, however, also be a liquid polymer melt. In the practice of the invention useful polymer precursors are selected from the group comprising urethanes, acrylates, esters, lactams, amides, siloxanes, aldehydes, phenols, anhydrides, epoxides, vinyls, alkenes, alkynes, styrenes, acid halides, amines, anilines, phenylenes, heterocycles and aromatic hydrocarbons. Precursors may, for example, also be halogenated, in particular fluorinated. Examples of useful precursors are described in Kitzerow, H-S, 1994, LIQ. CRYST., 16, 1-31, which is incorporated herein by reference. Useful polymer precursors can also be obtained from a wide variety of commercial sources one of them being US company Norland Product Inc. One example for a useful polymer (precursor) for the practice of the present invention is NOA65 obtainable from Norland.

In the practice of the invention useful liquid crystal materials are manifold, and a wide variety can be commercially obtained from various sources. For example the company Merck offers a wide range of liquid crystal materials. Although by no means limited thereto, useful examples in the practice of the present invention include liquid crystal compounds selected from the group comprising cyanobiphenyls and substituted cyanobiphenyls. The liquid crystal material referred to as "E7" which is a mixture of various proportions of different cyanobiphenyls is particularly useful; the choice of liquid crystal material, of course, depends on the intended application and purpose.

By the appropriate choice of a liquid crystal material desired properties can be achieved. For example, as will be shown below, the liquid crystalline material that is used to refill the matrix (which matrix had been formed by polymerization) can be appropriately selected so as to achieve a fast rise time response or a low $V_{90}$ and a reasonable high transmittance at zero volt ($T_0$), or a low $V_{90}$ as well as a low $T_0$, which would be highly desirable, if such a composite were to be used in a display device. Some examples for various possibilities are given below in example 7.

Different mechanism and methods exist to induce the material, containing polymer precursors, to undergo a polymerization reaction; these can, for example, be induction by UV-light, a radical addition reaction, a condensation reaction etc.

In the present invention, where a liquid crystal material is referred to as "being the same" as another liquid crystal material, this is meant to mean that the former liquid crystal material either comprises physically the bulk of the same molecules of the latter liquid crystal material, or the former liquid crystal material comprises the same chemical species as the latter liquid crystal material.

Where a liquid crystal material is referred to as "being different" to another liquid crystal material, this may mean a different chemical species or mixture, or it may signify that one of the two liquid crystal materials contains additional components in comparison with the (otherwise chemically identical) other liquid crystal material. These additional components may be other solutes like dyes etc. that one wants to transport into the composite (in which case they are included in the second liquid crystal material), or they may be unwanted solutes like uncured monomers that one wants to transport out of the composite (in which case the second liquid crystal material is purer than the first liquid crystal material containing these unwanted solutes.

In the practice of the present invention useful dyes may have additional groups which alter the colouring effect of the dye. These groups may be auxochrome groups, which alter the absorption spectral properties of the dye, such as $NR_2$, OR, COOH, $SO_3H$, CN. Examples of UV-sensitive dyes are dyes with azo-groups, or dyes which additionally have a permanent dipole moment like MORPIP.

It has been surprisingly found that by the present invention it is possible to prevent plasticizing of the polymer matrix and, in applications, where it is desirable to include a dye into the liquid crystal, to prevent the incorporation of liquid crystal and dye into the polymer matrix. This is achieved by pre-making a polymer matrix and adding the (e.g. dye doped) liquid crystal into it. This allows for applications with a higher colour contrast, and enables the incorporation of dyes and liquid crystal molecules, normally sensitive to UV light. The invention is also particularly useful in cases where it would be difficult to obtain a PDLC because no phase separation occurs. This may for example be the case where, for maximum transmission over wide viewing angles and maximum scattering, one wants to match the extraordinary/ordinary refractive indices of the polymer component and the liquid crystal component, and therefore chooses the polymer and the liquid crystal material accordingly. This usually results in a "phase-inseparability" of the two components. Prior art PDLC technique is bound to fail in this case, whereas with the method according to the present invention, one can simply form the polymer composite in a first step using any phase separable material, e.g. water, in order to allow for pore formation. Thereafter the phase separable material is washed out and replaced with the desired liquid crystal material. Another additional advantage is that the composite according to the present invention has a faster switch-off time thus allowing for faster refresh rates in display devices comprising the material.

The invention allows also for example the preparation of a PDLC prepared by photo curing of a liquid crystal/prepolymer composite, where dyes of any type compatible with the liquid crystal phase can be incorporated, regardless of their photosensitivity to ultra-violet light. Furthermore, this material type shows an improvement in the "turn-off" time. Amongst other aspects, the invention therefore provides for an improved PDLC material more suited to colour display applications.

In the following detailed description reference is made to the figures, wherein

Figure 2:
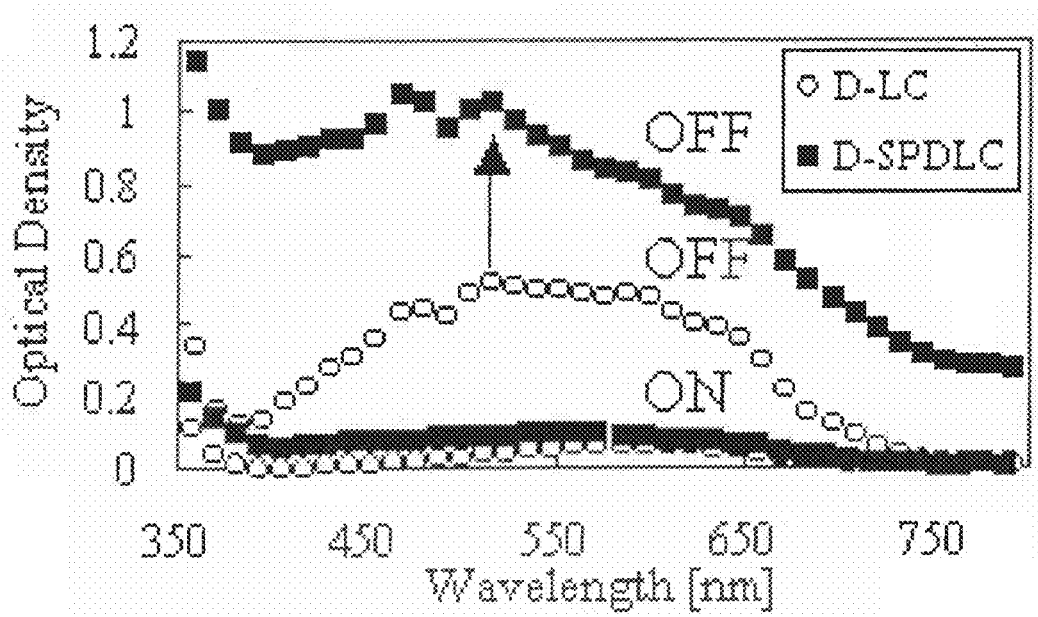

FIG. 1 shows the washing out of the PDLC-component, including any lc-material contained as a solute in the solid polymer phase, by means of acetone, FIG. 2 shows that the contrast ratio of the dye doped sponge-like PDLC (D-SPDLC) was improved by almost twice compared to the conventional dye doped liquid crystal (D-LC).

Figure 3:
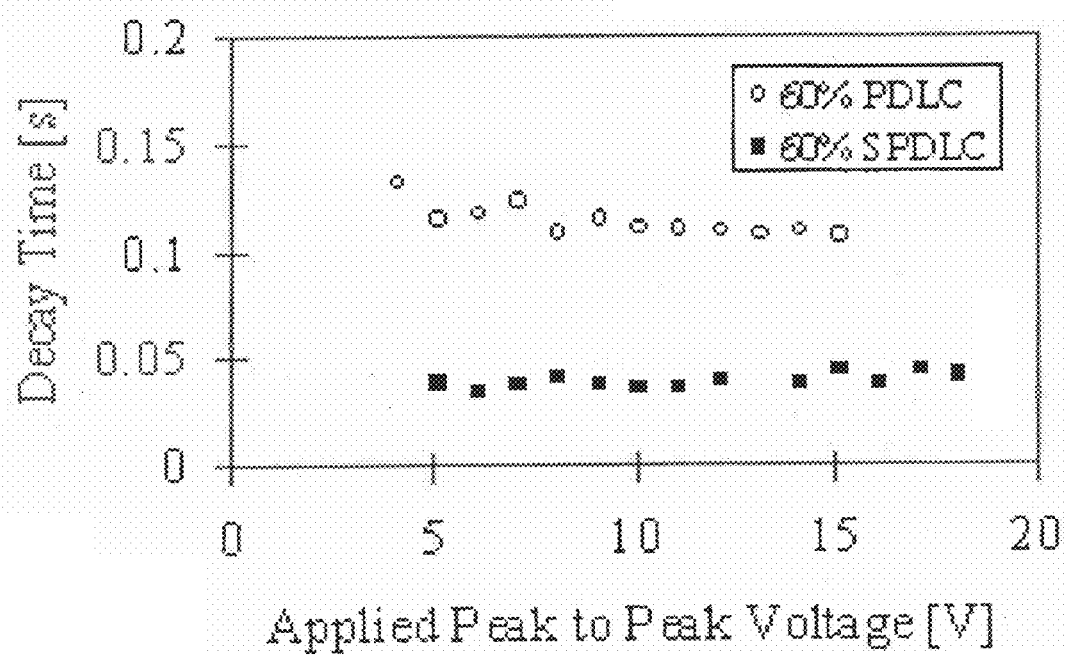
Figure 4:
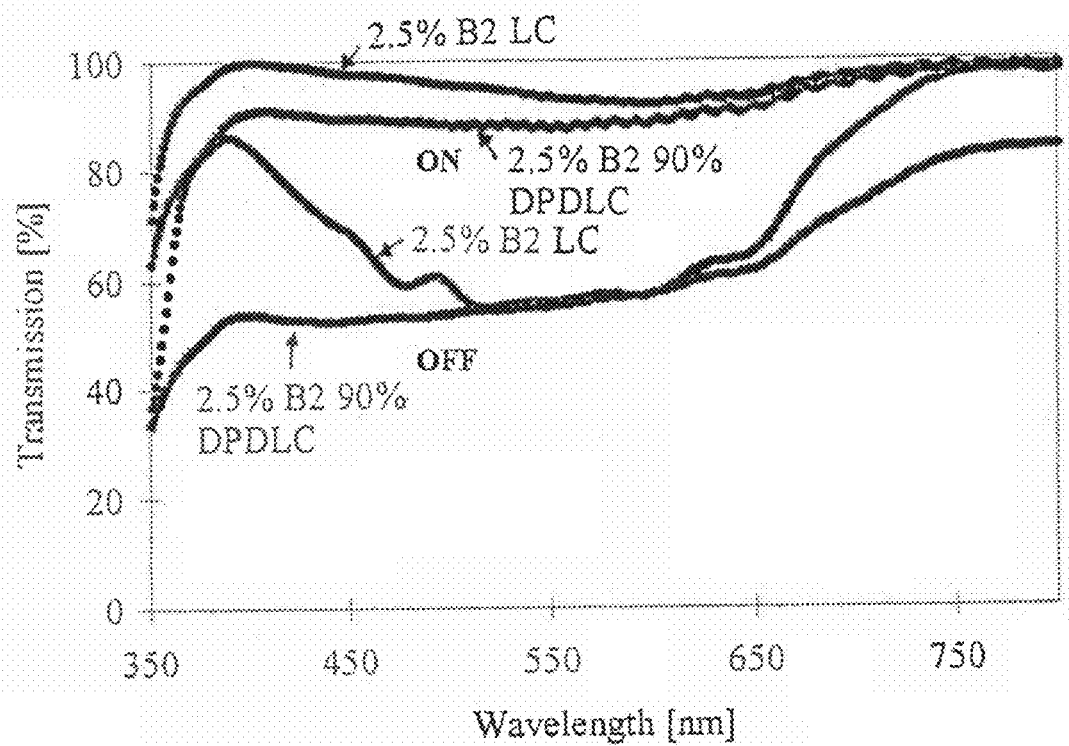
Figure 5:
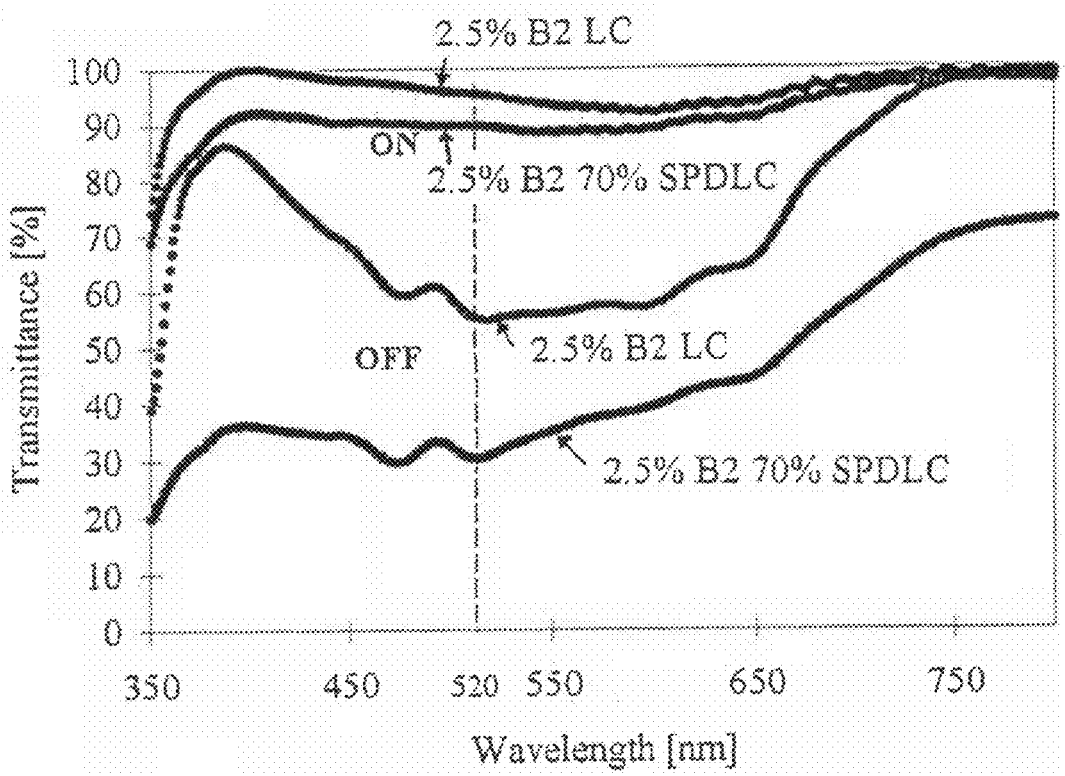
Figure 6:
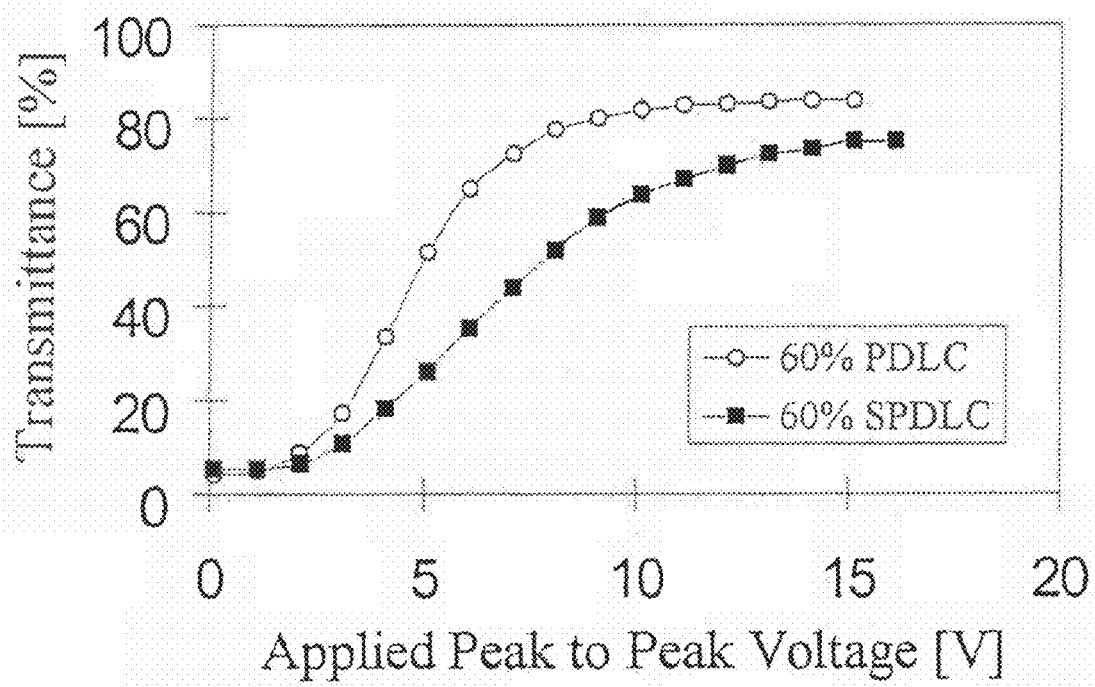
Figure 7:
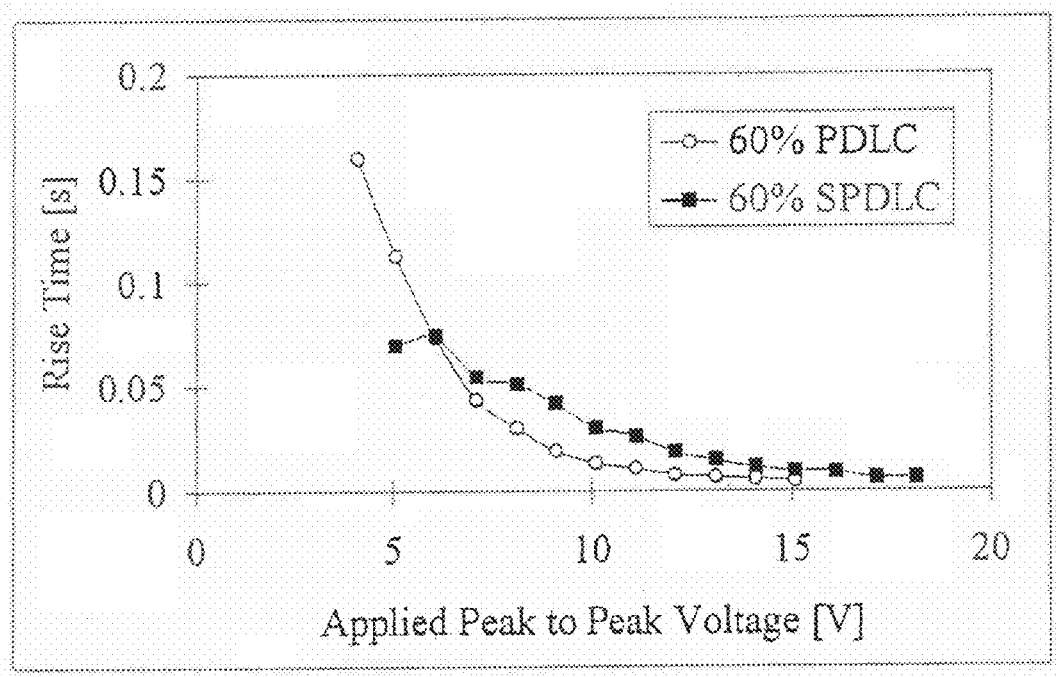
Figure 8:
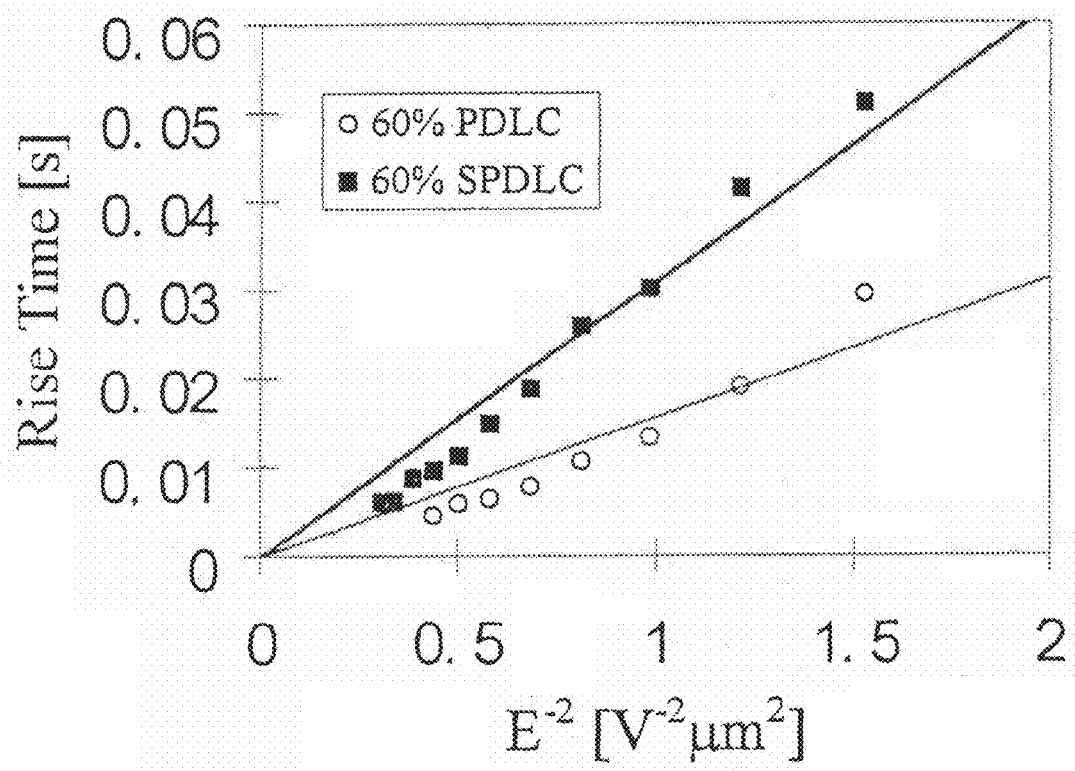
Figure 9:
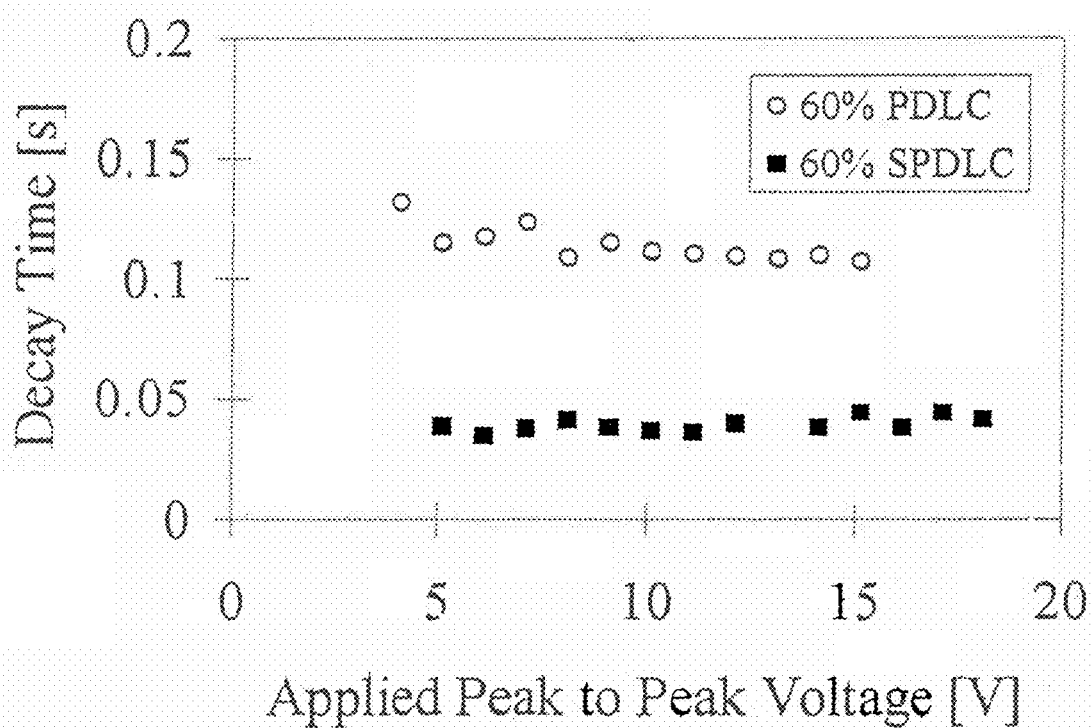

FIG. 3 shows the comparison for the switching times for a PDLC film prepared by a conventional method without dye (PDLC) and for a comparable material of the inventive subject (SPDLC=sponge polymer dispersed liquid crystal). Over a range of applied voltages, the reduction in switch-off time is approximately a factor of three, FIG. 4 shows a comparison of transmittance between a Dispersed PDLC (2.5% B2 90% DPDLC) with a Heilmeier liquid crystal (2.5% B2 LC) doped to the same concentration of dye, FIG. 5 shows a comparison of transmittance between a Sponge PDLC (2.5% B2 70% SPDLC) with a Heilmeier liquid crystal (2.5% B2 LC), FIG. 6 shows a transmittance measurement of undoped PDLC and undoped SPDLC vs. Applied Peak to Peak Voltage, FIG. 7 shows Rise Time Measurement of undoped PDLC and undoped SPDLC, FIG. 8 shows Rise Time Variation with inverse electric field square for PDLC and SPDLC, FIG. 9 shows Decay Time of undoped PDLC and undoped SPDLC.

The following examples are intended to describe the invention more specifically by way of example and are not intended to limit the scope or spirit of the invention.

Example 1

In one embodiment of the present invention, a dye-doped liquid crystal component of the PDLC is incorporated after the photo curing stage has been completed. The first stage in the preparation of the PDLC is that of the formation of the voids within which the dye-doped liquid crystal will reside. This is achieved by curing a homogeneous mixture of un-doped liquid crystal and liquid prepolymer. As an example, a 60% by weight mixture of E7 liquid crystal and NOA65 (Norland Optical Adhesive Inc.) liquid prepolymer may be cured using UV light to give an initial PDLC medium with well controlled LC droplet size and distribution. Following curing, the LC component, including any LC material contained as a solute in the solid polymer phase, is washed out using, for example, acetone (FIG. 1).

The voids remaining are then re-filled using dye-doped liquid crystal, forming a dye-doped sponge-like PDLC (S-PDLC). In a preferred example, the dye is a highly dipolar dye used for colouration of the PDLC and as a means to obtain faster "turn-on" time. Morpip is one such dye example.

The resulting PDLC material regardless of dye content exhibits a marked improvement in optical density (FIG. 2) and reduction in the "switch-off" time due to increased anchoring by the matrix walls (FIG. 3).

Typical values obtained according to the present invention (PDLC+2.5% B2) can be compared with a conventional Heilmeier liquid crystal (LC+2.5% B2) in the following table.

TABLE

|  | Absorption$_{ON}$ | Absorption$_{OFF}$ | contrast ratio A$_{OFF}$/A$_{ON}$ |
|---|---|---|---|
| PDLC + 2.5% B2 | 0.08 | 0.99 | 12.4 |
| LC + 2.5% B2 | 0.07 | 0.52 | 7.4 |

Conventional PDLCs

Sample Fabrication

First, a polymer-LC mixture was prepared by mixing an equal volume of the UV curable polymer, NOA65, and a doped liquid crystal E7. The mixture was stirred using Teflon coating magnetic stirrer for at least one hour in dark. A 10 µm empty glass cell with no alignment layer (KSSZ-10/B111PINTS from E.H.C. Co., Ltd., Japan) was filled with the solution at 70° C. Immediately after filling, the cell was cooled to the room temperature of 21° C., the cell was irradiated by means of UV light (360 nm, Spectroline, Model EN-180L/F, 230 V, 50 Hz, 0.17 A) at an intensity of 4.8 mW/cm$^2$.

This UV curing process initiates cross-linking of the polymer, making liquid crystal insoluble in the polymer. The phase separated liquid crystal forms droplets, they merge and grow bigger until the polymerization of the matrix has progressed sufficiently to lock their morphology. This curing process could be observed under a cross-polarised microscope. It is known that as the UV initiates cross-linking of polymers chains, the liquid crystal phase separates from them and merges to form bigger droplets. The size of the droplets can be controlled by the speed of the curing process which can be controlled by the intensity of the UV irradiation.

PDLCs with different morphologies of the droplet type could be made by varying E7-NOA65 composition and curing conditions. When the liquid crystal volume proportion to the polymer was 80 vol % (80% PDLC), the liquid crystal droplets were no longer spherical in shapes but deformed. When the liquid crystal proportion was increased to 90%, the enclosure of liquid crystal in polymer matrix disappeared, and the network of polymer was formed in liquid crystal matrix. When the 90% PDLC is cured faster, the phase separated polymer does not have enough time to form networks, and the polymer droplets are formed. These latter two types of PDLC are known as network type PDLC and polymer ball type PDLC.

Example 3

Novel PDLCs

To overcome the low contrast problem due to dye deterioration and dye trapping, two new dichroic PDLC fabrication techniques were proposed. For convenience, the PDLCs made by the first method were named Dispersed PDLC (DP-DLC), and the second ones were named Sponge PDLC (SP-DLC). Their fabrication and properties are described below.

a) Dispersed PDLC

The first method involves forcing doped liquid crystal "in", and consequently pushing un-doped liquid crystal "out" from a ready-made PDLC cell. This method may be applied only when the liquid crystal phase in the PDLC is interconnected. For the liquid crystal-polymer combination used in this work, the liquid crystal proportion in the PDLC must be more than 80% to achieve the continuous liquid crystal phase.

It turned out that in many instances there were polymer balls in the nematic liquid crystal. The refilling process did not sweep the polymer balls out from the cell, therefore they were probably attached to either side of the substrates. In these cases, the cell was made by curing 90% PDLC for 2 minutes with the UV source placed 10 cm away from the cell.

Further, the transmittance of the DPDLC was compared with a Heilmeier liquid crystal doped to same concentration of dye to see how scattering has improved the absorption of the dye. The result which can be seen in FIG. 4 showed a transmission decrease at 800 nm, which indicates that more scattering was present in DPDLC compared to Heilmeier liquid crystal. Even though the DPDLC has 10% less dyes present compared to the Heilmeier liquid crystal, the transmission at 550 nm stays the same (54%), implying the increase in dye absorption due to scattering. Unfortunately, the DPDLC contrast was 1.63 ($T_{ON}/T_{OFF}$=88%/54%) at 530 nm, which was still to weak for display applications that requires at least a contrast of 2.7. It was not possible to increase the contrast much more by using the same liquid crystal (E7) and polymer (NOA65) combination, as the mixture starts forming droplets under 80% PDLC. The network type PDLC or polymer ball type PDLC, which has continuous liquid crystal, with very high scattering would further improve the contrast using the dispersion method.

b) Sponge PDLC (SPDLC) (or Sponge-Like PDLC)

This second new fabrication technique, which gives an increased contrast compared to DPDLC introduced in the previous section, makes use of the fact that E7 liquid crystal is highly soluble in acetone, while NOA65 polymer is only slightly soluble. When a ready-made undoped PDLC cell was soaked in acetone, E7 liquid crystal and uncured monomer and oligomer in the PDLC cell slowly dissolve in the solution.

The cell became less scattering when E7 mixes with acetone, but it became weakly scattering again as the E7 is fully washed out. The duration of this process depends on the size and proportion of liquid crystal droplets. When the droplet sizes are in order of 1 μm, and the liquid crystal proportion is 50%, the washing process takes a few weeks. If the droplet sizes are in order of 100 μm, and the liquid crystal proportion is 90%, i.e. all the liquid crystal is connected together, the process takes only a few days.

After fully removing the E7, slow heating in the drying cabinet evaporated the acetone in the remaining acetone-polymer system. A sponge of polymer matrix with air cavities remained. Observation of the polymer sponge under a microscope did not show any noticeable difference in the matrix structure.

Then the cell was stood upright in a small beaker filled with desired dye doped liquid crystal, leaving one open-end of the cell not soaked in the liquid crystal. Then the beaker was quickly placed in a vacuum oven at 40° C. This refilling method in vacuum avoids any air left in the matrix after filled by doped liquid crystal. Finally, when the cell is refilled, it was taken out of the beaker, and both open-ends of the cell were sealed with epoxy.

Example 4

Contrast Measurement

Off-state transmittance of doped SPDLC and a conventional Heilmeier liquid crystal cells were compared to investigate the contrast improvement which could not be observed with doped PDLC. Both cells contained 2.5 wt % B2 in the liquid crystal. The liquid crystal proportion to polymer in SPDLC was 70%. B2 is a mixture of azo and anthraquinone dyes commercially available from Mitshubishi Chemical in Japan.

The result in FIG. 5 shows that the Heilmeier liquid crystal transmittance of 55% was decreased to 30% less liquid crystal, and hence 30% less dyes. At 520 nm, doped SPDLC achieved a contrast of 3.0 compared to 1.7 for the Heilmeier liquid crystal. The decrease in transmittance was clearly achieved by the scattering effect, as can be observed by the decrease of transmittance at 800 nm where there is no absorption by the dye. The effect of the scattering can be seen by a further decrease in the SPDLC transmittance at 400 nm. This is because the scattering efficiency decreases rapidly with increasing wavelength.

Example 5

Threshold Characteristic of SPDLC

Following the successful contrast result from the previous example the SPDLCs were investigated further by comparing the electro-optic properties of undoped SPDLC with undoped PDLC. Two identical undoped PDLC cells were made under the same conditions. The liquid crystal proportion of the PDLC's was 60%, and the cells were irradiated with UV from 10 cm away for 2 minutes. Both cells were 10 μm thick without any prior alignment treatment. Then one of these cells was converted to an undoped SPDLC sample by the following method. The E7 was simply washed away and the polymer sponge was filled with undoped pure E7 liquid crystal. Transmittance variation with applied voltage was measured and the result shown in FIG. 6 was obtained.

The result shows that the $V_{10}$ is 2.5±0.3 V for PDLC, and 3.5±0.3 V for SPDLC. $V_{90}$ for PDLC is 7.5±0.3 V and 12±0.3 V for SPDLC. Both $V_{10}$ and $V_{90}$ were increased by approximately 34% by transforming the PDLC into SPDLC. The increase indicates increase in anchoring energy at the polymer walls, caused by the removal of the uncured monomer and oligomer or drying, or combination of both.

The values for $T_{max}$, $T_{min}$, $V_{10}$, $V_{90}$, $V_{sat}$ are dependent on the sample and the cure conditions and vary from 0~100% ($T_{max}$, $T_{min}$), and from 0~>100 V ($V_{10}$, $V_{90}$, $V_{sat}$).

Typical values obtained according to the present invention are $T_{max}$ 80~100%, $T_{min}$ 0~30%, $V_{10}$ 0~5V, $V_{90}$ 5~20V; these values can, for example, be obtained from a composite comprising 60% E7 and 40% NOA65, where the thickness is 10 micron.

Example 6

Response Time Measurement

To further characterize the SPDCL, the response times of undoped PDLC and undoped SPDLC were measured using the same set-up used in the previous example. All cells tested were 10 μm thick without any surface alignment. Rise and decay time results are shown in FIG. 7 and FIG. 9 respectively.

The inconsistent variation at lower voltage, under 8V, was due to the liquid crystal not reaching full alignment. Nevertheless, the trend of undoped SPDLC responding slower to the electric field compared to undoped PDLC can be seen when higher voltages are applied. This difference shown more clearly when the rise time variation with inverse square of the electric field is plotted as shown in FIG. 8. Assuming that the PDLC behaves to electric field as liquid crystal does, a straight line through the origin was fitted to the data points, and the gradient calculated. The gradients of the PDLC and SPDLC samples were 0.016±0.002 sV² μm$^{-2}$ and 0.031±0.002 sV² μm$^{-2}$ respectively. Even though the lines were not fit perfectly, the difference in gradients clearly indicates that the SPDLC is approximately twice as slow as the PDLC. Nevertheless, they are both within the targeted range of 100 ms under an applied filed of 10 Vm.

The same PDLC and SPDLC cells were used to measure decay time, and the result is shown in FIG. 9. Surprisingly, the decay time of the SPDLC cell is only 73% of the decay time obtained for the PDLC cell. The SPDLC cell switches off as fast as it switches on, and this can be useful since the slow decay time of liquid crystals is one of the problems suffered by liquid crystal displays. The measured decay time for 10 µm Heilmeier liquid crystal was 250 ms, which is considerably longer than the 30 ms for SPDLC.

Increases in the rise time and decreases in the decay time, together with the increased threshold voltage measurement from the previous section, are common effects observed when the anchoring energy of the polymer wall is increased. Further measurements of anchoring energy would reveal the effect.

Example 7

SPDLC properties can be tuned to give desired properties by selecting an appropriate liquid crystal (LC) for the refilling (i.e. the second LC can be different from the LC which was first used to make the PDLC). The PDLCs used in the following were made by polymerization of PN393 in the presence of TL213. PN393 is an acrylate based UV curable polymer and is available from Merck. TL213 is a liquid crystalline material and is available from Merck. The table shows the properties of TL213-PN393 SPDLC cells refilled with three different nematic LCs available from Merck (TL213, TL203 and 5CB). For example, one can refill the SPDLC sponge with 5CB if it is desirable to have a fast rise time response while the degree of scattering at 0V is not important, i.e. $T_0$ can be high. On the other hand, TL203 might be selected if one requires a low $V_{90}$ while not sacrificing the transmittance ($T_0$) much. An LC used for refilling which decreases $V_{90}$ as well as $T_0$, is highly desirable for SPDLCs used in display devices.

TABLE

| | Contrast Ratio [$T_{100}/T_0$] | $V_{90}$ [V] | Rise time [ms] | Decay time [ms] | $T_0$ [%] | T100 [%] |
|---|---|---|---|---|---|---|
| TL213 | 4.077 | 8.6 | 96.5 | 198.02 | 19.49 | 79.49 |
| TL203 | 0.276 | 7.85 | 24.45 | 101.97 | 27.85 | 85.15 |
| 5CB | 1.591 | 4.05 | 1.36 | 354.76 | 56.36 | 89.69 |

Furthermore, it is also possible to further modify the properties of the SPDLC cells by adding a dichroic dye to the liquid crystal material that is used for refilling. In doing so, i.e. in using an absorbing dye-doped liquid crystal material for refilling, it is possible to achieve a colour-transparent test cell, i.e. a test cell that switches between a specific coloured state (depending on the (dichroic) dye used) to a transparent state. For the fabrication of such a colour-transparent test cell, it is important that the polymer matrix that is refilled with the liquid crystal material containing the dye, has a refractive index which is closed to or matching the refractive index of the liquid crystal. After the refilling of the filter with the liquid crystal material (containing the dye) it may be necessary to heat the cell above the liquid crystal's isotropic temperature and cool it again. The temperature however, must not exceed the decomposition temperature/melting temperature of the polymer matrix wherein the liquid crystal material was refilled.

In general, such a heating step should be performed for 1-20 minutes, preferably 1-10 minutes, more preferably 1-5 minutes, and the cooling should be performed over a period of 1-60 minutes, preferably 1-40 minutes, more preferably 5-20 minutes.

Example 8

In summary, the previous examples have shown the following:

The conventional PDLCs were made successfully using the UV initiated phase separation method. Other morphologies, such as polymer network type and polymer droplet type PDLC, could also be made by varying the proportion of liquid crystal to the polymer. Although these morphologies were interesting in themselves, they did not scatter sufficiently. The liquid crystal proportion of 50% with rapid curing provided the most scattering PDLC.

While measuring the optimum time needed for the PDLC curing, the doped PDLCs required far longer, as much as four times, the cure time required for the undoped PDLC. The reason was believed to be the UV absorption by dye, preventing the polymer curing. Also the deterioration of dyes was encountered for light sensitive dyes.

Nevertheless, the cure time required for MORPIP doped PDLC was the same as undoped PDLC, implying that the morphologies, such as droplet size, change were minimal by the MORPIP doping. Indeed, no observable change in droplet size and morphologies could be seen under the cross polarised microscope. Hence the response time of the PDLCs with different concentrations of MORPIP could be compared. The result showed that the rise time decreases with increasing concentration of MORPIP 45% decrease in rise time was recorded with 0.37 wt % of MORPIP. One of possible reasons for a difference in the rise time compared to the 21% decrease of the simple GH liquid crystal is the slight increase in droplet size MORPIP has some absorption at 360 nm, making the cure time required for MORPIP doped PDLC slightly longer and hence making the droplet size bigger than the undoped PDLC. The anchoring energy of such MORPIP doped PDLC is smaller, and consequently contributing to the further decrease of the rise time.

The contrast measurement of the doped PDLCs showed an insufficient contrast. The sources of the problems were determined as poor off-state scattering due to long cure time, and poor on-state transmittance due to the dyes trapped in the polymer matrix. The poor off-state scattering could be solved by using chemical accelerator to increase the curing speed. The poor on-state transmittance could be solved by chemical synthesis of dyes and liquid crystal who are insoluble to the polymer matrix. Otherwise different fabrication techniques of PDLC such as NCAP systems seem to produce better results.

Nevertheless conventional PDLCs of the prior art and, as an example of the invention, two new fabrication methods were proposed to overcome all the problems of long curing dye trapping as well as dye deterioration.

The first fabrication method was named Dispersed PDLC (DPDLC). It involves forcing doped liquid crystal "in", and consequently pushing undoped liquid crystal "out" from a ready-made PDLC cell. The technique avoided the exposure of dyes to UV as well as trapping of dyes. The method was simple, and it proved to increase dye absorption by increase in scattering. However, this method could be only applied when a liquid crystal droplets are interconnected to each other, and it was not possible to fabricate a high scattering network type PDLC with E7-NOA65 combination. It is possible to obtain a contrast 3 times as large as that of the droplet type PDLC thus application of the method to a high scattering polymer network of ball type PDLC would further improve the contrast of DPDLC.

The second fabrication method was named Sponge PDLC (SPDLC) (or "sponge-like polymer dispersed liquid crystal"). It involves washing out the liquid crystal "out" from undoped PDLC to make a sponge of polymer, and forcing the doped liquid crystal "in" to the open porous polymer. This method allowed the use of more scattering 50% PDLC, achieving the higher contrast of 3 compared to any of the dichroic PDLC made in this study. The preliminary results showed that undoped SPDLC has 34% increased threshold voltage of 12V, 100% longer rise time of 30 ms, but 73% shorter decay time of 30 ms compared to the conventional PDLC. Although the threshold voltage and rise time were slightly increased, the considerably shorter decay time would be useful for the display. The only disadvantage of the SPDLC was its slow fabrication owing to the diffusion of acetone into PDLC. Nevertheless, there is a scope for improvement in the fabrication speed by 1) modifying the diffusion process, 2) using different materials, and 3) using different polymer matrix structures.

By appropriate choice of liquid crystal materials it is possible to fine-tune the properties of SPDLCs.

The features disclosed in the specification, the claims and the drawings may, alone or in any combination thereof, be essential in the practice of the present invention.

What is claimed is:

1. A composite comprising a matrix component and at least one liquid crystal component, obtainable by a method comprising:
   providing a matrix;
   providing a first material that is phase separable from the matrix;
   adding the first material to the matrix;
   removing the first material that is phase separable from the matrix; and
   adding a second material that exhibits liquid crystalline behavior to the matrix after removing the first material such that the second material replaces the first material,
   wherein the matrix component is a solid polymer without dyes trapped.

2. The composite according to claim 1, wherein the at least one liquid crystal component is doped with a compound selected from a group consisting of UV-sensitive dyes, UV-stable dyes, dichroic dyes, and dyes with a permanent dipole, rod-like structure material, and nanotubes.

3. The composite according to claim 1, wherein
   Tmax and Tmin of the composite range from 0-100%, and
   V10, V90, and Vsat of the composite range from 0->100V.

4. The composite according to claim 3, wherein
   the Tmax ranges from 80-100%,
   the Tmin ranges from 0-30%,
   the V10 ranges from 0-5V,
   the V90 ranges from 5-20V,
   Absorption$_{on}$ of the composite ranges from 0.05-0.10,
   Absorption$_{off}$ of the composite ranges from 0.90-1.00, and
   a contrast ratio AOFF/AON of the composite ranges from 6-20.

5. A device, comprising:
   the composite according to claim 1.

6. The device according to claim 5, wherein
   Tmax and Tmin of the composite range from 0-100%, and
   V10, V90, and Vsat of the composite range from 0->100V.

7. The device according to claim 6, wherein
   the Tmax ranges from 80-100%,
   the Tmin ranges from 0-30%,
   the V10 ranges from 0-5V,
   the V90 ranges from 5-20V,
   Absorption$_{on}$ of the composite ranges from 0.05-0.10, and
   Absorption$_{off}$ of the composite ranges from 0.90-1.00.

8. An apparatus, comprising:
   the device according to claim 5,
   wherein the apparatus is one of a display, a smart window, a membrane, an optical valve, a Bragg grating, an optically sensitive memory, an infrared shutter, a gas flow sensor, a pressure sensor, and a polarizer.

9. An apparatus, comprising:
   the composite according to claim 1,
   wherein the apparatus is one of a display, a smart window, a membrane, an optical valve, a Bragg grating, an optically sensitive memory, an infrared shutter, a gas flow sensor, a pressure sensor, and a polarizer.

10. The composite according to claim 1, wherein the first material exhibits liquid crystalline behavior.

11. The composite according to claim 1, wherein the first material is liquid.

12. The composite according to claim 11, wherein the first material is selected from the group consisting of water, aqueous solutions, aqueous suspensions, aqueous emulsions and oils.

13. The composite according to claim 10, wherein the first material exhibiting liquid crystalline behavior is the same as the second material exhibiting liquid crystalline behavior.

14. The composite according to claim 10, wherein the first material exhibiting liquid crystalline behavior is different from the second material exhibiting liquid crystalline behavior.

15. The composite according to claim 1, wherein the second material exhibiting liquid crystalline behavior contains at least one additional component.

16. The composite according to claim 15, wherein the at least one additional component is soluble in the second material.

17. The composite according to claim 16, wherein the soluble component is selected from the group consisting of dyes, compounds with permanent dipoles, rod-like structure materials, and nanotubes.

18. The composite according to claim 17, wherein the soluble component is a dye selected from the group consisting of UV-sensitive dyes, UV-stable dyes, cis-trans isomer dyes, dichroic dyes and dipolar dyes.

19. The composite according to claim 1, wherein the at least one liquid crystal component is doped with a dye.

* * * * *